United States Patent Office 2,761,884
Patented Sept. 4, 1956

2,761,884
PREPARATION OF DITOLYL METHANE

Jan Koorevaar, Geleen, Netherlands, assignor to Stamicarbon N. V., Heerlen, Netherlands No Drawing. Application March 22, 1955,
Serial No. 496,059

Claims priority, application Netherlands April 9, 1954

7 Claims. (Cl. 260—668)

The present invention relates to the preparation of ditolyl methane by reacting toluene with formaldehyde.

It has previously been proposed (Berichte, 7, 1181–1183 (1874) to prepare ditolyl methane by reaction of toluene with formaldehyde in the presence of concentrated sulphuric acid and glacial acetic acid, the reaction being effected by adding a mixture of sulphuric acid and glacial acetic acid to a mixture of formaldehyde, toluene and glacial acetic acid.

British Patent No. 446,450 states that the above process can be improved, insofar as yields are concerned, if an aliphatic alcohol is used as the diluting agent in lieu of the glacial acetic acid. The yields obtained according to this patent, however, do not appear to exceed 65% by weight, calculated on the amount of formaldehyde, which may be used either in acqueous solution or in the form of a solid polymer, such as paraformaldehyde. Substantial amounts of resinous products are also formed by the process described in said British patent.

The principal object of the present invention is to provide a novel process for preparing ditolyl methane by reaction between toluene and formaldehyde.

A more specific object of the invention is the provision of a process for preparing ditolyl methane in higher yields than obtainable with the above-mentioned prior procedures, while avoiding the formation of substantial amounts of resinous by-products.

Other objects will be apparent from the ensuing description of the invention.

The foregoing objects are accomplished, according to the present invention, by means of a process which comprises passing a suspension of a solid formaldehyde polymer, e. g., paraformaldehyde, or trioxymethylene, in an excess of toluene, upwardly through a layer of 70–80% sulphuric acid, while maintaining said suspension intimately dispersed in said acid at a temperature not exceeding 50° C., separating excess toluene having the resulting ditolyl methane dissolved therein from said sulphuric acid and recovering the ditolyl methane from the excess toluene thus separated.

The reaction of toluene with formaldehyde is accompanied by the formation of water which tends to dilute the sulphuric acid. Accordingly, it is necessary to add concentrated sulphuric acid as the reaction proceeds in order to maintain a concentration of 70 to 80%, by weight, sulphuric acid.

The designated sulphuric acid concentration is critical to the success of the invention. Specifically, if a higher concentration is used, an undesirable increase in resin formation has been found to occur. Lower concentrations, likewise, effect a serious reduction in the yield of the desired product. In contrast, when the sulphuric acid concentration is maintained within 70–80% by weight, little resinous by-product is formed, as evidenced by the fact that the layer of sulphuric acid retains a light color, and the ditolyl methane yield reaches a maximum.

The reaction temperature is another factor which is critical to the present process. In particular, the temperature used should not exceed 50° C.; otherwise, there is a substantial formation of undesirable resinous by-products. Generally speaking, any temperature below 50° C. is satisfactory although room temperatures of the order of 20–30° C. are the most convenient.

The amount of toluene utilized must be in excess of that required for the reaction, although it may otherwise be varied over a wide range. Preferably, suspensions containing 10–25 grams of formaldehyde per liter of toluene are used. The reaction proceeds very rapidly with such low formaldehyde concentrations and only minor amounts of resins, e. g., less than 10% by weight of the final product, are formed. These relatively small amounts of resins represent a considerable advantage over prior art procedures since the resin formation is attended with a substantially corresponding loss of toluene.

As indicated, the suspension of solid formaldehyde polymer in toluene should be intimately dispersed in the sulphuric acid as it passes upwardly therethrough. Any convenient vibrating or agitating means may be used for this purpose. The length of time involved in contacting the suspension with the sulphuric acid can be widely varied and depends upon such factors as depth of the layer of sulphuric acid through which the suspension is passed. Normally, however, satisfactory results are obtained when from 0.4 to one liters of suspension are passed through 500 grams 70–80% sulphuric acid per hour. The excess toluene containing the desired ditolyl methane forms a distinguishable layer on the surface of the sulphuric acid and, after being separated from the acid, can be distilled or otherwise treated in any desired manner to recover the ditolyl methane.

The invention is further illustrated, but not limited, by the following examples.

*Example 1*

A cylindrical vessel having a diameter of 10 cm. was filled with 75% sulphuric acid to a height of 25 cm. A suspension of parafromaldehyde in toluene, containing 24 grams paraformaldehyde per liter of toluene, was introduced continuously into the bottom of the vessel. The feed rate was 3 liters of suspension per hour. The suspension was intimately dispersed in the sulphuric acid with the aid of a vibrator. The temperature was maintained at 27–30° C.

In order to keep the concentration of the acid constant, 144 g. of 90% sulphuric acid was added to the vessel and 188 g. of acid removed therefrom on an hourly basis.

The toluene solution separating from the surface of the sulphuric acid was continuously discharged and distilled. 429 g. of ditolyl methane was obtained per hour (yield: 91% by weight) and 42 g. of resin was left as residue. The ditolyl methane contained about 10% of condensation products of higher molecular weight.

*Example 2*

The process of Example 1 was repeated using a suspension containing 16 g. of paraformaldehyde per liter of toluene. The feed rate was 4 liters of suspension per hour. The temperature was maintained at 40–50° C.

Per hour, 128 g. of 90% sulphuric acid was added to the vessel and 166 g. of acid removed therefrom in order to keep the concentration of the 75% sulphuric acid constant.

The yield per hour was 393 g. of ditolyl methane (yield: 94% by weight) and 25 g. of resins. The ditolyl methane thus obtained contained about 10% of condensation products of higher molecular weight.

It will be appreciated that various modifications may be made in the invention as described herein. Thus, while the invention has been specifically described above in connection with the use of paraformaldehyde, other solid formaldehyde polymers such as trioxy methylene, may be utilized. Accordingly, the scope of the invention should be determined by the appended claims wherein I claim:

1. A process for preparing ditolyl methane which comprises passing a suspension of solid formaldehyde polymer in an excess of toluene upwardly through a layer of sulphuric acid of 70–80% concentration by weight wherein water is the sole diluent and at a temperature not exceeding 50° C. while maintaining said suspension intimately dispersed in the acid, separating excess toluene having the resulting ditolyl methane dissolved therein from said sulphuric acid and recovering the ditolyl methane from the excess toluene thus separated the concentration of said acid being maintained within the designated range by adding sulphuric acid of higher concentration and removing sulphuric acid which has been diluted by water formed in the reaction.

2. The process of claim 1 wherein the suspension contains from 10 to 25 grams of formaldehyde per liter of toluene.

3. The process of claim 1 wherein the suspension is passed through the acid at a temperature of 20–30° C.

4. The process of claim 1 wherein from 0.4 to one liters of suspension containing from 10 to 25 grams of formaldehyde per liter are passed through 500 grams of said acid per hour.

5. The process of claim 1 wherein the excess toluene is taken off the surface of said acid and the ditolyl methane is recovered therefrom by distillation.

6. The process of claim 1 wherein the concentration of said sulphuric acid is about 75%.

7. A process for preparing ditolyl methane which comprises passing a suspension of solid formaldehyde polymer in excess toluene and containing from 10 to 25 grams of formaldehyde per liter of toluene upwardly through sulphuric acid having a temperature of 20–30° C., and a concentration of 70–80% by weight with water as the sole diluent thereof while maintaining said suspension intimately dispersed in said acid, separating excess toluene having the resulting ditolyl methane dissolved therein from said sulphuric acid and recovering the ditolyl methane from the excess toluene thus separated, said suspension being passed through said acid at an hourly rate of 0.4 to 1 liter per 500 grams of said acid and said concentration of acid being maintained within the designated range of 70–80% by adding sulphuric acid of higher concentration and removing sulphuric acid which has been diluted by water formed in the reaction.

References Cited in the file of this patent

UNITED STATES PATENTS

| | | |
|---|---|---|
| 1,907,455 | Stenzel | May 9, 1933 |

FOREIGN PATENTS

| | | |
|---|---|---|
| 446,450 | Great Britain | Apr. 30, 1936 |